United States Patent
Berrier et al.

(10) Patent No.: US 6,326,452 B1
(45) Date of Patent: Dec. 4, 2001

(54) METHOD FOR PREPARING POLYORGANOSILOXANES BY HYDROLYZING ORGANOHALOSILANES

(75) Inventors: Roger Berrier, Peage de Roussillon; Loïc Doguet, Péage de Roussillon, both of (FR)

(73) Assignee: Rhodia Chimie, Courbevoie Cedex (FR)

(*) Notice: Subject to any disclaimer, the term of this patent is extended or adjusted under 35 U.S.C. 154(b) by 0 days.

(21) Appl. No.: 09/462,959
(22) PCT Filed: Jul. 8, 1998
(86) PCT No.: PCT/FR98/01470
 § 371 Date: May 10, 2000
 § 102(e) Date: May 10, 2000
(87) PCT Pub. No.: WO99/05202
 PCT Pub. Date: Feb. 4, 1999

(30) Foreign Application Priority Data

Jul. 24, 1997 (FR) .................................................. 97 09673

(51) Int. Cl.$^7$ .................................................. C08G 77/08
(52) U.S. Cl. .............................. 528/12; 528/10; 556/450; 524/837
(58) Field of Search ........................ 528/12, 10; 524/837; 556/450

(56) References Cited

U.S. PATENT DOCUMENTS 5,783,718 * 7/1998 Doguet et al. .................... 556/453

FOREIGN PATENT DOCUMENTS

| 0 515 082 | 11/1992 | (EP) . |
| 0 524 526 | 1/1993 | (EP) . |
| 0 658 588 | 6/1995 | (EP) . |
| 2 743 812 | 7/1997 | (FR) . |

* cited by examiner

Primary Examiner—Margaret G. Moore
(74) Attorney, Agent, or Firm—Burns, Doane, Swecker & Mathis, L.L.P.

(57) ABSTRACT

The invention concerns a method for preparing polyorganosiloxanes by hydrolysing organohalosilanes of formula (I) $R_a R^1_b SiX_c$, in which R, $R^1$ are identical or different radicals and represent hydrogen or linear or branched C1–C6 alkyls, aryls, alkylaryls or aralkyla X represents a halogen, and $a+b+c=4$ and $0<c<4$; characterised in that it consists essentially in carrying out: at three successive hydrolysing steps (1), (2), (3), wherein the reaction medium is capable of exerting an increasing hydrolysing force on the organohalosilane (I), and optionally, at least a coalescing step (4); in that step (1) is a hydrolysis under pressure in the presence of an aqueous saturate hydrogen halide solution $S_1$, at the reaction medium pressure and temperature; and in that the advanced hydrolysing step ($3_1$) brings into the reaction medium a water supply in the form of water free from or practically free from dissolved solutes and/or by means of aqueous hydrogen halide solution(s).

18 Claims, 1 Drawing Sheet

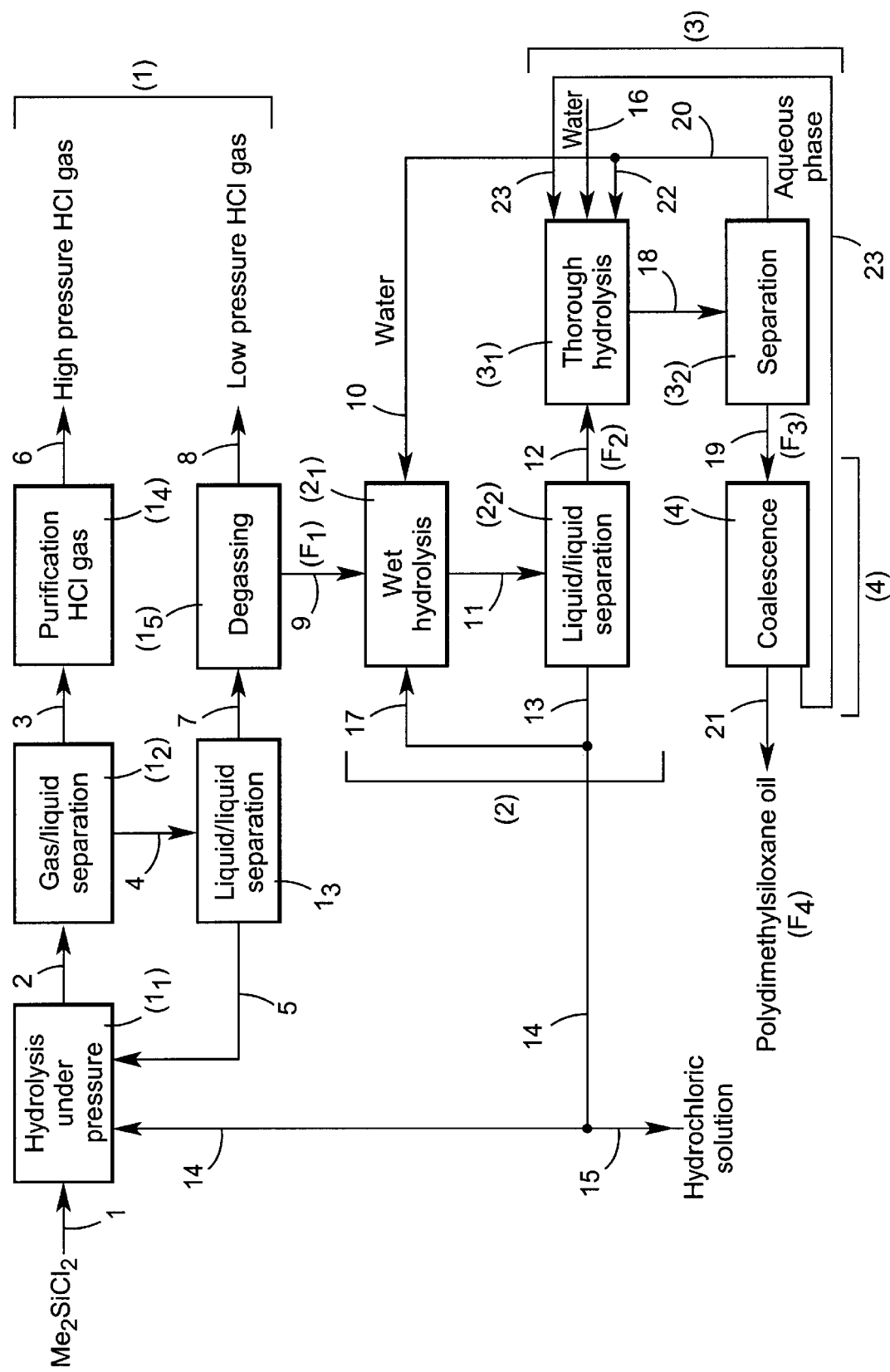

METHOD FOR PREPARING POLYORGANOSILOXANES BY HYDROLYZING ORGANOHALOSILANES

The present invention relates to a fundamental principle of silicone chemistry, namely the hydrolysis of halosilanes and more particularly of organohalosilanes to obtain poly (organo)siloxanes. This synthesis is based on the very high reactivity with water of ≡Si-Cl bonds and, to a lesser extent, of ≡SiOR bonds (R=alkyl).

Organohalosilanes are thus converted by hydrolysis and polycondensation (homo- and heterocondensation) into intermediate polyorganosiloxanes (oligoorganosiloxanes) of linear or cyclic structure, which may themselves be polymerized and crosslinked into silicone oils or into silicone elastomers of higher molecular weight.

Dimethyldichlorosilane is an organohalosilane which is well known as a starting material for this hydrolysis/condensation reaction.

Technical processes involving the said hydrolysis/condensation reaction of $Me_2SiCl_2$ operate continuously and are fully established industrially. This is described, for example, by H. K. Lichtenwalner and M. M. Sprung in Encyclopedia of Polymer science Vol. 12 Wiley and Sons, New York, 1970.

The hydrolysis of $Me_2SiCl_2$ leads to a complex mixture of cyclic and linear oligoorganosiloxanes. Conventionally, the source of reaction water required for the hydrolysis is a hydrochloric acid solution. To make this process as viable as possible, the hydrochloric acid formed by hydrolysis is recovered and may thus be upgraded, for example, by being reacted with methanol to form chloromethane, which is a starting material in the synthesis of dimethyldichlorosilane, according to the direct synthesis process.

Various proposals for the hydrolysis of organohalosiloxanes, e.g. $Me_2SiCl_2$, find their place in the prior art.

Thus, a process is known, from French patent application Ser. No. 2,512,028, for the hydrolysis of organohalosilanes, in particular of $Me_2SiCl_2$, in which the source of water for hydrolysis of the organohalosilane is an aqueous hydrochloric acid solution having at least 35% by weight of hydrogen chloride, the said solution being used in an amount such that the $H_2O$/organochlorosilane molar ratio ranges between 10 and 30. The hydrolysis takes place in a single step. The aims targeted here are, on the one hand, to reduce significantly the weight percentage of halogen (chloride) in the polyorganosiloxane-based hydrolysate obtained, and, on the other hand, to obtain better cyclopolyorganosiloxane yields. For reaction temperatures of between 20 and 30° C., the concentration of the aqueous HCl solution is less than or equal to 37% by weight. In any case, irrespective of the temperature, this HCl solution is never saturated in the examples of that patent application Ser. No. 2,512,028.

The drawback of such a hydrolysis in the presence of an excess of water leads to large amounts of aqueous hydrochloric acid. Now, given that the most easily upgradeable KCl is HCl gas, it is necessary to carry out a distillation of the aqueous HCl, which is particularly expensive.

In addition, hydrolysis in the presence of an excess of water is extremely exothermic, inevitably entailing operating difficulties.

The invention covered by French patent application No. 2,518,099 has the aim of overcoming these drawbacks, by using a virtually stoichiometric amount of water, for a one-step hydrolysis of dimethyldichlorosilane. This makes it possible to obtain anhydrous hydrochloric acid (gas), a saturated aqueous hydrochloric acid solution and a polyorganosiloxane hydrolysate. Although the aqueous HCl at the end of the hydrolysis is saturated, it emerges from the examples that this is in no way the case for the initial HCl solution. Cf. Example 3:37% by weight at 60° C. It may therefore be concluded that the HCl produced in the reaction is not entirely released in gaseous form.

The invention according to FR-A-2,518,099 is aimed at avoiding the excesses of water without, however, creating conditions of a water deficit, which are known to give rise to linear polyorganosiloxanes that are not fully hydrolysed and comprise halogens (chlorines) in terminal positions. This is entirely penalizing since the hydrolysis must then be completed using large amounts of water, thereby leading to aqueous HCl effluents that are particularly burdensome and awkward to deal with insofar as it is difficult to recycle them and/or to reprocess them at a lower cost.

It is not possible to carry out this additional hydrolysis with small amounts of water since, under such conditions, a polycondensation of the oligoorganosiloxanes takes place, the direct consequence of which is to increase the viscosity prohibitively.

More recently, U.S. Pat. No. 5,169,970 discloses a process for the hydrolysis of organochlorosilanes, according to which the hydrolysis is carried out in two stages:
- the first hydrolysis step consists in hydrolysing the organochlorosilane by using a substantially stoichiometric amount of water and thus producing a hydrolysate consisting of polyorganosiloxanes,
- in the second hydrolysis step, the hydrolysate obtained from step 1 is subjected to this same treatment, but this time using an amount of water in stoichiometric excess, the source of water consisting of an HCl solution having a predetermined HCl concentration.

This process is supposed to make it possible to obtain a polyorganosiloxane hydrolysate without suffering the drawbacks of the known techniques involving a hydrolysis step, and which include either an excess of water or a deficit of water, or a stoichiometric amount of water, relative to the organohalosilane. This process would also make it possible to regulate the viscosity of the polyorganosiloxane obtained.

This process is flawed in that it produces HCl gas at low pressure, which complicates the recovery and upgrading of this gas.

The principle of a two-step hydrolysis is also adopted in the process for the manufacture of polydimethylsiloxane described in European patent application No. 0,658,588. According to this process, dimethyldichlorosilane is reacted in a first step with water, supplied by an aqueous hydrochloric acid solution with a concentration of 25% by weight, in order to obtain a crude hydrolysate consisting of cyclic and linear αω-dichloro polydimethylsiloxanes and hydrogen chloride gas, with the exclusion of an aqueous HCl solution.

It should be noted, furthermore, that under the reaction conditions of step 1, the solution is not saturated with HCE.

In a second step, the crude hydrolysate is treated with steam to reduce its chlorine content by additional hydrolysis, which also results in the formation of aqueous hydrochloric acid. The latter is recycled into the first step of the process.

The pressure of hydrogen chloride gas in the first step is between 0.15 and 0.5 MPa, in particular between 0.25 and 0.35 MPa. The temperature of step 1 is room temperature, whereas for step 2, reference is made to a temperature of between 110 and 160° C. At the end of the first hydrolysis step, the polydimethylsiloxane obtained comprises 50% cyclic oligomers and 50% linear α, ω-chloro oligomers.

The use of such an HCl concentration in the hydrolysis step 1 and of a high temperature in step 2 makes it difficult to stabilize and to control the viscosity of the final products.

Patent application DD-227,145 describes a process for the preparation of neutral dimethyldichlorosilane hydrolysate having a low viscosity and stability on storage, as well as a residual content of SiCl bonds of less than 10 ppm.

This process comprises a treatment for the removal of the remaining SiCl groups and aqueous HCl contained in a dimethyldichlorosilane hydrolysate by passing this hydrolysate, after washing and/or neutralization, through a porous material in sheet form. This material is a fibrous material of the paper or textile type (wool, cellulose, polyester, glass fibre). Such a filtration is carried out at room temperature and makes it possible to obtain a hydrolysate having a residual SiCl content of 2 ppm and an undetectable HCl concentration.

This process for the treatment of dichlorodimethylsilane hydrolysate does, admittedly, make it possible to reduce the impurities in the final product, but the efficacy of such a process can really only be guaranteed if the prior steps lead to a product which is fit to be treated by coalescence on a porous support.

However, this cannot be said for the hydrolysate according to DD-227,145.

It emerges from this review of the prior art that there is a need for a process for the preparation of polyorganosiloxanes by hydrolysis of organohalosilanes which makes it possible to obtain a hydrolysis product of the hydrogen halide type in gaseous form and under pressure, which makes it possible to remove the $\equiv$SiX bonds as fully as possible;

which leads to a final polyorganosiloxane hydrolysate that is free or virtually free of acidic aqueous droplets;

which makes it possible to avoid the formation of excessive amounts of acidic aqueous effluents, with its inherent problem of reprocessing, which makes it possible to control the viscosity of the polyorganosiloxane, and lastly, which makes it possible to manufacture a polyorganosiloxane of high quality and in particular of high purity, so as to afford it optimum stability.

The present invention seeks to overcome this deficiency, by providing a process which satisfies the specifications targeted above.

The present invention also seeks to provide a process for the preparation of polyorganosiloxane in which the hydrolysis takes place in the presence of a deficit of water, relative to the stoichiometric amounts, in the initial hydrolysis phase, and which moreover does not require the subsequent use of large amounts of water in order to remove the terminal Si-halogen residues that are still present in too high a concentration after the first hydrolysis. This avoids the production of halogen-containing aqueous effluents that are difficult to recycle and/or to reprocess, on account of the siloxane impurities that they always contain.

The present invention also seeks to provide a process for the preparation of polyorganosiloxanes by hydrolysis of organohalosilanes, which offers the possibility of ensuring constant control of the viscosity of the reaction medium.

The present invention also seeks to provide a process for the hydrolysis of organohalosilane leading to polyorganosiloxanes, which are free or virtually free of residual halogens, as well as of aqueous droplets containing a solute formed by the hydrogen halide obtained from the hydrolysis.

The present invention also seeks to provide a process for the preparation of polyorganosiloxanes by hydrolysis of organohalosilanes, which is easy to carry out and economical (high levels of productivity and of yield).

The present invention also seeks to provide a process for the hydrolysis of organohalosilanes leading to polyorganosiloxanes, this process needing to be able to be carried out according to a continuous or batchwise mode, by satisfying the specifications targeted above in one or other of the cases.

The present invention thus provides a process for the preparation of polyorganosiloxanes by hydrolysis of organohalosilanes of formula (I) $R_aR^1_bSiX_c$, in which:

R and $R^1$, which can be the same or different, are hydrogen or linear or branched $C_1$–$C_6$ alkyls, $C_6$–$C_{12}$ aryls, alkylaryls or aralkyls;

X represents a halogen; and a+b+c=4 and 0<c<4; which process comprises;

at least three successive hydrolysis steps (1), (2), (3), in which the reaction medium is capable of exerting an increasing hydrolysing force on the organohalosilanes (I), and, optionally, at least one coalescence step (4), wherein step (1) is a hydrolysis under pressure in the presence of an aqueous solution $S_1$ which is saturated with hydrogen halide at the pressure and temperature of the reaction medium and water free or virtually free of dissolved solutes and/or one or more aqueous hydrogen halide solution, for example $S_3$ and/or $S_4$ as defined below, is involved as a source of water in the hydrolysis (3), typically in the thorough hydrolysis ($3_1$) as defined below.

The alkyl moieties of the said alkylaryl and aralkyl groups typically have up to 6 carbon atoms. R and $R^1$ are preferably both methyl.

Typically, the said hydrogen halide has the formula H-X, where X is the halogen present in the said organohalosilane of formula (I).

We have thus demonstrated, entirely surprisingly and unexpectedly, that the combination:

firstly, of at least three successive hydrolysis steps with an increasing hydrolysing force secondly, of a first hydrolysis step under pressure, with a saturated aqueous phase of hydrogen halide corresponding to the hydrolysis products of the $\equiv$SiX halosilane bonds, and, thirdly, of a third hydrolysis step requiring the addition (and thus the consumption) only of water, with the exclusion of an exogenous aqueous saline or alkaline solution, makes it possible to obtain pure polyorganosiloxanes free of residual SiX and of traces of aqueous phase.

Such a result is all the more advantageous since it may be achieved relatively easily and economically, with good productivity and good yields, according to a continuous or batchwise mode.

In addition, the process of the invention does not generate large amounts of halide-contaminated effluent. This greatly simplifies the process with regard to its environmental impact.

It should also be mentioned that the problem of controlling the viscosity of the reaction medium, which, moreover, follows directly from controlling the hydrogen halide concentration is solved by the present invention, which is based on the use of 3 hydrolysis steps with an increasing hydrolysing force and on the saturation of the starting aqueous phase with hydrogen halide.

Without wishing to be bound by the theory, it may be considered that the process according to the invention allows optimization of the hydrolysis as less of the hydrolysis water is involved in hydrating the hydrogen halide.

For the purposes of the present invention, the expression increasing hydrolysing force is understood to refer to a nucleophilicity gradient of the reaction medium, this gradient extending over the three hydrolysis steps (1), (2) and (3). More precisely, this means that the reactivity of the aqueous phase towards the -SiX bonds increases with increasing hydrolysing force.

For the purposes of the invention, as regards the notion of saturation with hydrogen halide of the aqueous phase of the reaction medium of step (1), it should be understood that the concentration of hydrogen halide solute in the water is at a maximum. That is to say that the reaction medium is in a gaseous atmosphere formed by the hydrogen halide gas.

It is clear that this point of saturation naturally depends on the nature of the hydrogen halide solute as well as on the temperature and pressure conditions of the medium. A person skilled in the art is entirely capable of dealing with this question of the saturation of the solution $S_1$ from step (1).

The "pure" water free or virtually free of dissolved solutes with which the process according to the invention is concerned is defined thus in order to distinguish it from solutions, in particular saline or alkaline solutions. In practice, it is conventional demineralized water obtained from tap water originating from the mains. Demineralization is ordinarily carried out by passing through ion exchange resin(s). For further details in this respect, reference is made to "l'Encyclopédie des Sciences et des Techniques" [Encyclopedia of Science and Technology], published by Les presses de la cité, 1972, p. 149–150, which gives in particular a demineralization scheme involving ion exchange resins. Reference may also be made, with respect to demineralization, to the Encyclopedia of Chemical Technology, Third Edition, Volume 13, p. 700–701, published by John Wiley & Sons, 1981.

The demineralized water does not comprise significant amounts of solutes. According to a first preferred mode of the process according to the invention, the source of water in the thorough hydrolysis step $(3_1)$ is "pure" water as defined above and at least one aqueous hydrogen halide (e.g. hydrochloric) solution. This (or these) water-supplying solution(s) is (are) preferably formed by one or more downstream (recycling) effluent and more especially still by the effluent $S_3$ and/or $S_4$ as defined below.

According to a second, even more preferred embodiment, most of the water source in step $(3_1)$ is provided by at least one aqueous hydrogen halide solution. In this embodiment, the "pure" water is present as a minor component of the water source for the thorough hydrolysis $(3_1)$.

The water-supplying solution(s) is (are) advantageously composed of effluents, preferably downstream effluents, generated by the process (recycling) and, more especially still, of the downstream effluents $S_3$ and optionally $S_4$ of steps $(3_2)$ and (4), as defined below, respectively.

In accordance with a preferred embodiment of the process according to the invention, a continuous operating mode is adopted.

Moreover, without this being limiting, the halogen X is preferably chlorine, such that the halide produced in this case is HCl. For simplicity, halogen X or chlorine (Cl) and hydrogen halide (HX) and hydrogen chloride (HCl) will be used without discrimination in the remainder of this description.

It is naturally preferable to employ one and the same type of hydrogen halide (e.g. HCl) in the context of the process according to the invention. However, the invention also covers the use of different hydrogen halides.

Preferably, step (1) of hydrolysis under pressure comprises:

Δ at least one hydrolysis $(1_1)$ of organohalosilanes (I) to obtain a crude hydrolysate having at least three phases, the three phases being:
1—a gas phase comprising hydrogen halide gas under pressure,
2—a siloxane fluid $F_1$ consisting essentially of linear α,ω-dihalo oligomers and, optionally, to a lesser extent, of cyclic oligomers; and
3—an aqueous phase comprising the solution $S_1$ saturated with hydrogen halide;

Δ at least one gas/liquid separation $(1_2)$ to separate the hydrogen halide gas and a mixture of $F_1$ and $S_1$;

Δ at least one liquid/liquid separation $(1_3)$ allowing recovery of $F_1$ and $S_1$, the latter advantageously being recycled into $(1_1)$;

Δ optionally at.least one purification $(1_4)$ of the gas collected in $(1_2)$, preferably by condensation;

Δ and optionally at least one additional degassing $(1_5)$ of the fluid $F_1$ collected in $(1_3)$, preferably by decompression.

Advantageously, this reaction $(1_1)$ takes place continuously with vigorous stirring in a closed chamber, for example at a temperature of between 10 and 70° C. and at a pressure determined by the hydrogen halide gas produced by hydrolysis.

In practice, the hydrogen halide gas pressure is adjusted to a value greater than or equal to 0.10 MPa and preferably between 0.15 and 1 MPa.

The input flow rates of the reactants into the reactor of step $(1_1)$ are adjusted such that the mass ratio of phase to supply $MR_1$=aqueous phase/organohalosilane (I) is $\geq 2$ and preferably between 3 and 15.

This MR is one of the important characteristics of the process according to the invention since it determines, together with the hydrogen halide concentration of the aqueous phase and the stirring regime (inter alia), the water concentration at the aqueous phase/organohalosilane (I) interface, and the hydrolysing force of the medium is, obviously, dependent on this interfacial water concentration.

The crude hydrolysate obtained at the end of step $(1_1)$ is advantageously a three-phase mixture.

In practice, $F_1$ typically consists essentially of a mixture of linear α,ω-dihalo oligoorganosiloxanes and of cyclic oligoorganosiloxanes in which:

the lenear α,ω-dihalo oligoorganosiloxanes represent at least 50 mol %, preferably at least 60 mol %, of the mixture; and the cyclic oligoorganosiloxanes represent not more than 50 mol %, preferably not more than 40 mol %, of the mixture.

This siloxane fluid $F_1$, which is also referred to as "chlorosilox", contains, for example, about 7 to 13% by weight of residual halogen. The residual halogen typically comprises HX and compounds containing $\equiv$SiX groups.

Advantageously, the duration of the reaction of step $(1_1)$ is between 30 s and 5 min, preferably between 1 and 2 min.

The hydrogen halide gas obtained at the end of step $(1_2)$ of gas/liquid separation is typically obtained under pressure. It may be upgraded for practical purposes, for example as regards HCl, in the industrial preparation (at high throughput) of methyl chloride, by reaction with methanol. Methyl chloride is a starting material in the synthesis of organosilanes.

Optionally, the gas obtained in ($1_2$) may be purified under pressure, by means of a treatment ($1_4$), which may be, for example, a condensation at a temperature of from 0° C. to −10° C., thereby making it possible to eliminate light volatile polysiloxanes.

As specified above, it is advantageous to recycle the hydrochloric solution $S_1$, recovered after the liquid/liquid separation ($1_3$). Such a recycling in step ($1_1$) has an influence on the quality of the final siloxane fluid or oil. According to a preferred embodiment of the invention, the recycling constitutes the sole or predominant route of supplying hydrochloric solution $S_1$ in step ($1_1$). Consequently, the mass ratio for the recycling of $S_1$, on (I) will be, in this embodiment, equivalent to the $MR_1$ defined above, that is to say greater than or equal to 2 and preferably between 3 and 15 or very close to $MR_1$.

The optional degassing ($1_5$) of $F_1$ can be carried out, for example, by means of a flash decompression with a ΔP of about 0.2 MPa, for example. Hydrochloric acid gas can be thus recovered, which may be upgraded directly towards an industrial synthesis. Such a degassing ($1_5$) makes it possible to increase the yield of hydrochloric acid gas by at least 3%.

Preferably, step (2) comprises at least one wet hydrolysis ($2_1$) which takes place, with stirring, at a temperature of from 10 to 50° C. and in which the siloxane fluid $F_1$ obtained after step (1) is reacted with an aqueous solution $S_{21}$, of said hydrogen halide. The concentration of the dyrogen halide solute in $S_{21}$ corresponds to a fraction of the reference saturation concentration (Csr), of the same hydrogen halide solute in an aqueous solution under the same temperature and pressure conditions, this fraction being from 45 to 75%, preferably from 50 to 72%, of Csr. The mass ratio of phase to supply $MR_2$=aqueous phase/fluid $F_1$ is adjusted to a value greater than or equal to 1.5, preferably between 2 and 10, so as to allow the hydrolysis of at least 95%, preferably at least 98% of the ≡SiX bonds and thereby to obtain a siloxane fluid $F_2$ consisting essentially of linear α,ω-dihydroxylated or α,ω-dihalo oligomers and, optionally, to a lesser extent, of cyclic oligomers. This wet hydrolysis involves water and more specifically an aqueous phase which is liquid at the reaction pressure and at the reaction temperature, preferably with the exclusion of water in the vapour form.

In the wet hydrolysis step (2), a higher hydrolysing force than that of step (1) is used, such an increase being achieved by increasing the amount of water in the hydrolysis medium and thus decreasing the HX concentration. In accordance with the invention, this wet hydrolysis 2 is intended to further the progress of the hydrolysis of the SiX bonds to a value sufficiently close to 100%, that is to say, for example, ≧95%, preferably ≧98%.

The adjustment of the hydrolysing force of the hydrolysis medium of step (2) may be perceived, in particular:

through the HCl concentration, which is thus advantageously a fraction of from 45 to 75% of the Csr,
and through the temperature.

One of the original characteristics of the process according to the invention is, for given experimental conditions, to adjust the HCl concentration in order to adjust the reaction progress.

In any case, the HX concentration is articularly critical since the chlorosiloxanes hydrolysed in step (2) typically comprise approximately as many ≡SiX bonds as =≡SiOH bonds. This means that the risks of polycondensation are great and it is known that the main consequence of such a reaction is a prohibitive increase in the viscosity of the polyorganosiloxanes and thus of the entire reaction medium.

Preferably, the solution $S_3$ (obtained in step ($3_2$) as defined below) is recycled to essentially provide the water requirement in step ($2_1$) [aqueous phase or solution $S_{21}$ forming the reaction medium for step ($2_1$)]. A minor component of the water requirement for step ($2_1$) can be contributed by the effluent $S_{22}$ obtained from step ($2_2$) as defined below. This use of downstream effluents as starting materials is economically advantageous, in particular in that it allows the HCl yield to be increased.

Another important parameter is the duration of the reaction between $F_1$ and the aqueous phase $S_{21}$, in step (2w). Advantageously, this duration is from 4 to 20 min, preferably from 7 to 12 min.

For step ($2_1$), it is preferable to maintain a homogeneous liquid/liquid mixture, by means of vigorous stirring in the reaction medium (e.g. stirred reactor or closed loop).

In practice, the siloxane fluid $F_2$ —also known as "acidic silox"—typically contains, for example, about 0.6 to 3% by weight of residual halogen. The residual halogen content typically comprises HX and compounds containing ≡SiX groups. Preferably, the concentration of residual halogen in $F_2$ is about 1.5±0.5% by weight.

By way of example, the concentration of hydrogen halide in $S_{21}$ is about 30% when step ($2_1$) takes place at about 25° C. for from 7 to 12 min.

Preferably, step (2) also includes at least one separation operation ($2_2$), preferably by settling, of the siloxane fluid $F_2$ obtained from ($2_1$) and of the concentrated aqueous solution $S_{22}$ resulting from the conversion of $S_{21}$ after wet hydrolysis ($2_1$); this solution $S2_2$ is preferably at least partly recycled into the wet hydrolysis ($2_1$) and/or into the hydrolysis under pressure ($1_1$), as a supply of hydrolysis water. The possibilities of recycling $S_{22}$ into step ($1_1$) and/or step ($2_1$) contribute towards the economy of the process according to the invention.

The separation ($2_2$) is, for example, an operation of settling by gravity.

The siloxane fluid $F_2$ obtained from step (2) still contains a few ≡SiX bonds to be hydrolysed as well as droplets of halogen-containing (e.g. hydrochloric) solution $S_{22}$. Thus, in order to perfect the hydrolysis and the purification, step (3) is then carried out, which comprises at least one treatment ($3_1$) of thorough hydrolysis of the siloxane fluid $F_2$ obtained in (2), using water added to the medium, via "pure" water (as defined above) and/or one or more aqueous hydrogen halide (e.g. hydrochloric) solution(s), preferably those originating from recycled downstream effluents.

The water content of the reaction medium of the thorough hydrolysis ($3_1$) is typically greater than or equal to 90% by weight, preferably ≧94% by weight and more preferably still from 94 to 97% by weight.

The amounts of $F_2$ and of the "pure" water and/or aqueous hydrogen halide solution(s) preferably obtained after the recycling and more preferably still composed of $S_3$ and/or $S_4$ originating from steps ($3_2$) and/or (4) as defined below and employed in ($3_1$) are typically adjusted so that the mass ratio of phase to supply $MR_3$=aqueous phase/Fluid $F_2$ (acidic silox) is greater than or equal to 1.5 and preferably is from 2 to 10.

This third step is advantageously carried out by using, as source of water for the medium for thorough hydrolysis ($3_1$) "pure" water and at least one aqueous hydrogen halide (e.g. hydrochloric) solution advantageously comprising at least one downstream eeffluent, preferably $S_3$ and/or $S_4$, which is thus recycled in step ($3_1$). This preferred recycling provides for a portion of the water supply of the reaction medium of step ($3_1$). In practice, it is entirely desirable for the bulk of the water contribution to ($3_1$) to be made by means of at least one recycling aqueous hydrochloric solution, preferably by means of $S_3$ and optionally $S_4$.

It is easily understood that the use of water as predominant reactant in the hydrolysis step $3_1$, preferably resulting mainly from a hydrochloric solution formed by a recycled downstream effluent, such as $S_3$ and optionally $S_4$, contributes to the simplification and of the economics of the process.

This is because the effluent $S_3$ produced on completion of $(3_2)$, as defined below, is upgraded by recycling. It does not contain impurities or pollutants (salts) making it a waste to be treated. This therefore eases the pressure on the process in terms of waste management.

In addition, this introduction in $3_1$ of "pure" demineralized water and/or of hydrogen halide (e.g. HCl) solution is favourable to a good yield of hydrogen halide (HCl) and thus of POS being obtained.

This treatment $(3_1)$ thus makes it possible to complete the hydrolysis of the residual $\equiv$SiX bonds in $F_2$, which is thus converted into siloxane fluid $F_3$, consisting essentially of linear $\alpha,\omega$-dihydroxylated oligomers and, to a lesser extent, of cyclic oligomers.

Advantageously, the reaction time of the thorough hydrolysis $(3_1)$ is longer than or equal to 5 min, preferably longer than or equal to 10 min. However, it goes without saying that, in any case, the term of this reaction $(3_1)$ will depend on the moment at which all of the $\equiv$SiX groups have been hydrolysed. It is the responsibility of the person skilled in the art to evaluate and determine this moment, in order to minimize the duration of the industrial process.

According to an advantageous mode of the invention, step $(3_1)$ takes place at at least 60° C., preferably from 70 to 100° C. and even more preferably from 80 to 90° C.

Advantageously, $F_3$ has a residual halogen content of less than or equal to 60 ppm, preferably less than or equal to 30 ppm. The residual halogen content typically comprises HX and compounds containing $\equiv$SiX groups. The residual halogen content which consists of compounds containing $\equiv$SiX groups is generally less than 1 ppm.

In practice, it is advantageous to homogenize the reaction medium during step $(3_1)$ (e.g. stirred reactor or closed loop).

In addition step (3) preferably includes at least one separation operation $(3_2)$, preferably by settling, of the siloxane fluid $F_3$ obtained from $(3_1)$ and of the aqueous phase $S_3$. The aqueous phase, once recovered, can be at least partly recycled at least into step $(3_1)$ and optionally into step $(2_1)$ provided that this aqueous phase $S_3$ contains no salt. This settling allows a siloxane fluid or an oil $F_3$ to be collected, in which all or substantially all of the $\equiv$SiX bonds are hydrolysed.

The siloxane fluid $F_3$ recovered at the end of the separation step $(3_2)$ is, admittedly, totally hydrolysed, but may still contains droplets of aqueous phase $S_4$.

Thus, according to an optional, but nevertheless advantageous, mode of the invention, $F_3$ is subjected to a coalescence step (4) which comprises passing the fluid $F_3$ through a porous material so as to extract the droplets of acidic aqueous phase $S_4$ contained in $F_3$, to obtain a siloxane fluid $F_4$ consisting essentially of linear $\alpha,\omega$-dihydroxylated oligomers having a residual halogen content of less than or equal to 10 ppm, generally of less than or equal to 2 ppm, and, to a lesser extent, of cyclic oligomers (30%). In addition to $F_4$, an aqueous phase $S_4$ (hydrochloric solution) is recovered after this step (4). This solution $S_4$ can, as is mentioned above, be recycled in the upstream hydrolysis steps, preferably in step $(3_1)$ Advantageously, the porous material used in step (4) is selected from the following group of materials:

precipitation silicas, woven or nonwoven fibrous supports based, for example, on glass fibres and/or on polymer fibres (cellulose, polyester, polypropylene), glass fibres, zeolites, and mixtures thereof.

According to an original and advantageous characteristic of the invention, the siloxane fluids $F_3$ and $F_4$ free of $\equiv$SiX bonds and virtually free of droplets of aqueous phase typically have a viscosity at 25° C. of less than or equal to 50 mpa·s, preferably less than or equal to 40 mpa·s and even more preferably from 25 mpa·s to 35 mpa·s.

Such a low viscosity is particularly welcome insofar as it significantly facilitates the handling and processing of the fluids treated in the process. Furthermore, this makes it feasible and entirely possible to envisage the succession of typical steps of the process according to the invention in order to obtain at the end a polyorganosiloxane of high quality and high purity, as indicated above.

More precisely, the percolation treatment of $F_3$ through a porous support allowing the coalescence of the residual droplets of aqueous phase is preferably carried out at a flux (flow rate/unit of surface area) of from 1 to 10 cm/min and at a temperature of about 50° C., for example.

Advantageously, the final content of linear $\alpha,\omega$-dihalo oligomers of $F_4$ is from 50 to 70% by weight, the remainder of $F_4$ comprising cyclic oligoorganosiloxanes.

Insofar as it has been seen above that the preferred halogen X, in the context of the invention, is chlorine, it may be specified, in a non-limiting manner, that $Me_2SiCl_2$, $MeHSiCl_2$ or $Me_3SiCl$ will be preferred as starting organohalosilane.

Irrespective of the embodiment of the continuous or batchwise process according to the invention, a person skilled in the art will be entirely capable of selecting the necessary equipment (closed or open reactors, settling tanks, pressure-release systems, coalesces, etc.) in order to produce a device for carrying out the process considered.

The invention will be better understood with the aid of the examples which follow, of the preparation of polydimethylsiloxane oil $F_4$ by hydrolysis of dimethyldichlorosilane ($Me_2SiCl_2$). These examples clearly bring forth all the advantages and implementation variants which may be envisaged for the process according to the invention.

BRIEF DESCRIPTION OF THE DRAWINGS

The single FIG. 1 appended shows the flow diagram of a process taken by way of non-limiting example in order to illustrate the invention.

This is a process operating continuously, in which a flow 1 of $Me_2SiCl_2$ is subjected to hydrolysis step $(1_1)$ under pressure. Flows 14 and 5 of hydrochloric solution $S_1$ which are respectively formed by the recycled HCl solutions $S_1$, and $S_{22}$ from steps $1_3$ and $2_2$ do, themselves also, participate directly in the hydrolysis $(1_1)$.

This hydrolysis produces a crude hydrolysate comprising a siloxane fluid $F_1$, HCl gas and an aqueous phase formed of a solution saturated with HCl. $S_1$. This hydrolysate is represented by flow 2, which is subjected to step $(1_2)$ of gas/liquid separation, leading to a gas flow 3 which is subjected to a purification $(1_4)$ by condensation at −5° C., the said purification $(1_4)$ making it possible to obtain HCl gas under high pressure in a flow 6. The separation $(1_2)$ also generates a flow 4 formed of a liquid/liquid mixture which is subjected to a separation $(1_3)$, at the end of which are produced, on the one hand, a flow 5 of solution $S_1$, recycled into $(1_1)$, and a flow 7 formed of a siloxane fluid (chlorosilox $F_1$).

Chlorosilox $F_1$ is subjected to a degassing ($1_5$) by decompression, which generates a gas flow 8 of low-pressure HCl and a liquid flow 9 formed of degassed $F_1$.

The latter is subjected to a wet hydrolysis ($2_1$), which requires a water supply flow 10, via the solution $S_3$ or aqueous phase 20 recycled at the end of step ($3_2$), and a supply flow 17 of aqueous recycled HCl solution $S_{22}$ from ($2_2$). The wet hydrolysis ($2_1$) leads to a flow 11 consisting of a liquid mixture of siloxane fluid $F_2$ and of HCl solution $S_{22}$. This flow 11 is subjected to a liquid/liquid separation ($2_2$) by settling. This generates a flow 13 of aqueous HCl solution $S_{22}$ composed of flow 17 for recycling into step ($2_1$) and of a flow 14 of $S_{22}$ for recycling into step ($1_1$). The excess $S_{22}$ recycled by the flow 14 is removed via a flow 15. The separation ($2_2$) also leads to a flow 12 corresponding to the siloxane fluid $F_2$, which is subjected to a thorough hydrolysis ($3_1$), requiring supplying with a flow 16 of demineralized water, with a flow 22 of settled aqueous solution $S_3$ originating (flow 20) from the separation ($3_2$) and with a flow 17 formed by the HCl solution $S_4$ originating from step 4. The flow 18 obtained from step ($3_1$) is a liquid mixture of polyorganosiloxane and of hydrochloric solution $S_3$. After separation ($3_2$) the flow 18 leads to a flow 20 of hydrochloric solution $S_3$ and to a flow 19 of siloxane fluid $F_3$. This flow 20 of $S_3$ gives rise to the abovementioned recycling flow 22 and to another recycling flow 10 supplying $S_3$ to the wet hydrolysis medium ($2_1$).

$F_3$ is lastly subjected to the coalescence treatment (4), which generates a flow 21 consisting of the siloxane fluid $F_4$ or polydimethylsiloxane oil freed of virtually all of the aqueous HCl droplets $S_4$. The latter optionally constitute a recycling flow 23 of $S_4$ into step ($3_1$).

The process according to the invention thus makes it possible to envisage a continuous operating mode in which are provided, on the one hand, 3 hydrolysis steps determining an increasing hydrolysing force in the direction of the flow for preparation of POS and, on the other hand, a countercurrent of halogenated (hydrochloric) aqueous solution, by the set of aqueous phase recyclings: preferably $S_1$, in ($1_1$), $S_{22}$ in ($1_1$) and ($2_1$), $S_3$ in ($3_1$) and ($2_1$), and $S_4$ in ($3_1$), completed by a conveyance of "pure" water.

EXAMPLE

Step 1:

The following are supplied to a reactor/degasser/decanter assembly operating at the service pressure b=0.3 MPa absolute and at a temperature T=30° C.:

Me$_2$SiCl$_2$ of 10 kg/h,

HCl solution titrating at 30%, of 1.8 kg/h $S_{22}$, aqueous HCl solution titrating at 44%, at a rate of 98 kg/h ($S_1$), such that the mass ratio for supply of the aqueous and siloxane phases MR$_1$ is 10.

The chlorosilox or siloxane fluid $F_1$ obtained after step ($1_5$) is produced at a rate of 6.15 kg/h.

The weight composition of $F_1$ is as follows:

8.8% of residual chlorine (of HCl and ≡SiCl types),

30% of cyclic oligoorganosiloxanes,

70% of linear α,ω-chloro oligoorganosiloxanes.

The chlorosilox $F_1$ has a viscosity of 4.7 mpa·s.

Step 2

The siloxane fluid $F_1$ is introduced into another reactor/decanter assembly at a rate of 6.15 kg/h. This reactor/decanter assembly is simultaneously supplied with aqueous 5% HCl solution ($S_3$) at a rate of 1.45 kg/h and with aqueous 30% HCl solution ($S_{22}$) at a rate of 25 kg/h, such that MR$_2$=4.4.

The pressure prevailing inside the reactor of step (2) is 0.1 MPa and the temperature is about 30° C.

The siloxane fluid $F_2$ obtained after step ($2_2$) (also known as acidic silox) is produced at a flow rate of 5.8 kg/h. This acidic silox $F_2$ comprises 1.3% by weight of residual chlorine (of HCl and ≡SiCl types).

The viscosity of the acidic silox $F_2$ is 33 mPa·s at 25° C.

$F_2$ comprises 33% by weight of cyclic polydimethylsiloxane and 67% by weight of α,ω-dihydroxylated polydimethylsiloxane. Step 3:

The acidic silox $F_2$ is supplied to a reactor/decanter assembly at a rate of 5.8 kg/h, with "pure" water and at a flow rate of 1.4 kg/h, and with 32 kg/h of recycled aqueous phase ($S_3$) obtained from the separation step ($3_2$).

0.02 kg/h of acidic water recovered in step 4 is also injected.

The MR$_3$=5.76.

The HCl concentration in the aqueous phase is 5% by weight.

The pressure prevailing in the reactor/decanter assembly is 0.1 MPa and the temperature is 85° C.

The siloxane fluid $F_3$ obtained after step ($3_2$) is supplied at a rate of 5.76 kg/h.

This siloxane fluid $F_3$, also known as neutral silox, comprises 0.0007 kg/h of residual HCl (of ECl type), 33% by weight of cyclic polydimethylsiloxane and 67% by weight of linear, essentially α,ω-dihydroxylated, polydimethylsiloxane.

The viscosity of $F_3$ is 34 opals at 25° C. Step 4:

The neutral siloxane $F_3$ is percolated onto a porous support consisting of precipitated silica having average pore diameters equal to 350 μm. The supply flow rate of $F_3$ is 5.76 kg/h. The rate of migration through the porous support is 1.5 cm/min. The pressure is 0.1 MPa and the temperature is 20° C.

What is claimed is:

1. A process for the preparation of polyorganosiloxanes by hydrolysis of organohalosilanes of formula (I) R$_a$R$^1_b$SiX$_c$, wherein, R, R$^1$ are identical or different radicals and represent hydrogen or linear or branched C$_1$–C$_6$ alkyls, C$_6$–C$_{12}$ aryls, alkylarlyls or aralkyls, X represents a halogen, and a+b+c=4 and 0<c<4; said process comprising:

at least three successive hydrolysis steps (1), (2), (3), where the reaction medium is able to exert an increasing hydrolyzing force on the organohalosilanes (I), and, optionally, at least one coalescence step (4), wherein step (1) is a hydrolysis under pressure in the presence of an aqueous solution $S_1$ which is saturated with hydrogen halide at the pressure and temperature of the reaction medium, and, in the hydrolysis step (3), water free of or almost free of dissolved solutes and/or one or several hydrogen halide aqueous solution(s) is introduced as the water source.

2. The process according to claim 1, wherein it is carried out continuously.

3. The process according to claim 2, wherein the hydrolysis step (1) comprises:

($1_1$) at least one hydrolysis of organohalosilanes (I) to obtain a crude hydrolysate having at least three phases comprising:

a gas phase comprising hydrogen halide gas under pressure, a siloxane fluid $F_1$ comprising α,ω-dihalogenated linear oligomers and optionally, to a lesser extent, of cyclic oligomers, and an aqueous phase containing the hydrogen halide saturated solution $S_1$;

($1_2$) at least one gas/liquid separation to separate the hydrogen halide gas and a mixture of $F_1$ and $S_1$;

($1_3$) at least one liquid/liquid separation to recover $F_1$ and $S_1$, where $S_1$ is optionally recycled in ($1_1$);

($1_4$) optionally, at least one purification of the gas collected in ($1_2$); and ($1_5$) optionally, at least one additional degassing of the fluid $F_1$ collected in ($1_3$).

4. The process according to claim 3, wherein the hydrolysis step ($1_1$) takes place under agitation in at least a closed chamber, at a temperature ranging between 10 and 70° C., and under a pressure of hydrogen halide gas greater than or equal to 0.10 MPa, where the mass ratio aqueous phase: organohalosilane (I) is greater than or equal to 2:1.

5. The process according to claim 4, wherein the duration of the hydrolysis reaction of step ($1_1$) ranges between 30 s and 5 min.

6. The process according to claim 1, wherein step (2) comprises at least one humid hydrolysis ($2_1$) which takes place, under agitation, at a temperature ranging between 10 and 50° C. and in which the siloxane fluid $F_1$ obtained in step (1) is reacted with a concentrated aqueous solution $S_{21}$, of said hydrogen halide, to obtain a siloxane fluid $F_2$ comprising α,ω-dihydric or a,w-dihalogenated linear oligomers and, optionally, to a lesser extent, of cyclic oligomers, and a concentrated aqueous solution $S_{22}$ of said hydrogen halide, the concentration of hydrogen halide in $S_{21}$ being from 45 to 75% of the reference saturation concentration (Csr) of the same hydrogen halide in an aqueous solution under the same temperature and pressure conditions; and the mass ratio aqueous phase: fluid $F_1$ being greater than or equal to 1.5:1, so as to allow the hydrolysis of the ≡Si-X links of the siloxane fluid $F_1$ to at least 95%.

7. The process according to claim 6, wherein the duration of the humid hydrolysis reaction ($2_1$) ranges between 4 and 20 min.

8. The process according to claim 6, wherein step (2) further comprises at least one separation operation ($2_2$) of the siloxane fluid $F_2$ obtained in ($2_1$) from the concentrated aqueous solution $S_{22}$.

9. The process according to claim 6, wherein step (3) comprises at least one hydrolysis treatment ($3_1$) of the siloxane fluid $F_2$ obtained in (2), where the quantities of $F_2$ and of water and/or aqueous hydrogen halide being such that the mass ratio aqueous: Fluid $F_2$ (acidic silox) is greater than or equal to 1.5:1, where said treatment ($3_1$) makes it possible to complete the hydrolysis of the residual ≡Si-X links in $F_2$, which is then converted into a siloxane fluid $F_3$, comprising α,ω-dihydric linear oligomers and, to a lesser extent, of cyclic oligomers.

10. The process according to claim 9, wherein step ($3_1$) takes place at a temperature that is greater than or equal to 60° C.

11. The process according to claim 9, wherein step (3) further comprises at least one separation operation ($3_2$) of the siloxane fluid $F_3$ obtained in ($3_1$), and of the aqueous phase, to recover aqueous phase ($S_3$) which is at least partially recycled at least in step ($3_1$) and optionally in step ($2_1$).

12. The process according to claim 11, further comprising step (4) which comprises passing siloxane fluid $F_3$ obtained from ($3_2$) through a porous material so as to extract the droplets of the acid aqueous phase contained in $F_3$ to obtain a siloxane fluid $F_4$ comprising α,ω-dihydric linear oligomers having a residual halogen content of less than or equal to 10 ppm and, to a lesser extent, of cyclic oligomers, and an aqueous phase $S_4$ which is optionally recycled to an earlier step.

13. The process according to claim 12, wherein the porous matter is selected from precipitation silicas, woven or unwoven fibrous supports, fibrous supports having a glass fiber base, polymer fibers, zeolites or mixtures thereof.

14. The process according to claim 12, wherein the siloxane fluids $F_3$ and $F_4$ have a viscosity at 25° C. that is less than or equal to 50 mPa.s.

15. The process according to claim 1, wherein the halogen X is chlorine.

16. The process according to claim 15, wherein the original organohalosilane is $Me_2SiCl_2$, $MeHSiCl_2$ or $Me_3SiCl$.

17. The process of claim 1, wherein in hydrolysis step (3), water free of dissolved solutes and/or one or several hydrogen halide aqueous solution(s) is introduced as the water source.

18. The process of claim 1, wherein in hydrolysis step (3), water free of alkaline or saline components and/or one or several hydrogen halide aqueous solution(s) is introduced as the water source.

* * * * *